United States Patent [19]

Kolt

[11] Patent Number: 5,538,293
[45] Date of Patent: Jul. 23, 1996

[54] SECONDARY DUCT INSTALLATION APPARATUS AND METHOD FOR A FORCED AIR VENTILATION SYSTEM

[75] Inventor: Stanley Kolt, Mamaroneck, N.Y.

[73] Assignee: Thinking Vents, Inc., Mamaroneck, N.Y.

[21] Appl. No.: 342,212

[22] Filed: Nov. 18, 1994

[51] Int. Cl.$^6$ .................................................. F16L 35/00
[52] U.S. Cl. ........................... 285/24; 285/424; 285/189; 29/428
[58] Field of Search .................................. 285/424, 205, 285/162, 194, 24, 27, 189; 29/428

[56] References Cited

U.S. PATENT DOCUMENTS

| 1,106,761 | 8/1914 | Weikert et al. | 285/205 X |
|---|---|---|---|
| 1,661,674 | 3/1928 | Osborn | 285/424 X |
| 2,799,518 | 7/1957 | Anderson et al. | 285/194 X |
| 3,221,572 | 12/1985 | Swick | 285/205 X |
| 3,606,404 | 9/1971 | McGann | 285/424 |
| 4,294,476 | 10/1981 | Nash | 285/424 X |
| 4,470,606 | 9/1984 | Knowles | 277/4 |
| 4,491,124 | 1/1985 | Goettel | 285/424 X |
| 4,620,729 | 11/1986 | Kauffman | 285/158 |
| 5,393,106 | 2/1995 | Schroeder | 285/424 X |

*Primary Examiner*—Dave W. Arola
*Attorney, Agent, or Firm*—David L. Davis

[57] ABSTRACT

Apparatus and method for installing a secondary duct to a main duct in a forced air ventilation system utilizes a gasket having a central opening which functions as a template for cutting an opening into the main duct after the gasket is secured to a flat surface of the main duct. The secondary duct is then inserted through the openings of the gasket and the main duct and is secured to the main duct and the gasket so as to seal the openings.

10 Claims, 2 Drawing Sheets

5,538,293

SECONDARY DUCT INSTALLATION APPARATUS AND METHOD FOR A FORCED AIR VENTILATION SYSTEM

BACKGROUND OF THE INVENTION

This invention relates to forced air ventilation systems and, more particularly, to improved apparatus and method for installing a secondary duct to a main duct in such a system.

In a forced air ventilation system, there is typically a main duct which is pressurized from a source of conditioned air. To distribute the conditioned air, secondary ducts are tapped into the main duct. The main and secondary ducts are typically formed from relatively thin sheet metal, generally aluminum, and their connection has heretofore not been entirely satisfactory, resulting in air leaks and not providing suitable mechanical support. It is therefore a primary object of the present invention to provide an improved structure and method for connecting a secondary duct to a main duct in a forced air ventilation system.

In the past, when connecting a secondary duct to a main duct in a forced air ventilation system, the installer would choose a location along the length of the main duct at which the connection to a secondary duct was desired. The main duct typically has at least one flat surface and the installer would, as carefully as possible, cut the sheet metal of the main duct to form an opening through the flat surface. In some installations, such as disclosed for example in U.S. Pat. No. 4,620,729, a circular opening is made and a flanged fitting is adhesively secured to the main duct by means of an intermediate resilient gasket. The secondary duct is then secured to the fitting. Such an installation is disadvantageous in that it requires a relatively expensive fitting for each secondary duct connection. A more common type of installation is effected by the installer cutting an opening, inserting the secondary duct through the opening, and sealing the opening with heavy aluminum tape designed for ductwork. This is disadvantageous in that there is minimal structural support for the secondary duct and the air seal is generally ineffective, thereby degrading the efficiency of the forced air ventilation system. The tape also has a tendency to deteriorate and allow leakage. It is therefore a more specific object of the present invention to provide structure and method for connecting a secondary duct to a main duct in a forced air ventilation system which is inexpensive, provides support for the connection of the secondary duct to the main duct, and provides an effective air seal at the connection.

SUMMARY OF THE INVENTION

The foregoing and additional objects are attained in accordance with the principles of this invention in a forced air ventilation system having a main duct formed of sheet metal with at least one flat surface by providing a generally planar gasket secured to the flat surface of the main duct. The gasket is formed of rigid sheet material and has a central opening which functions as a template for cutting an opening in the main duct flat surface, the openings of the gasket and the main duct flat surface being in overlying registration. A secondary duct is provided, which is formed of sheet metal with a cross section matching the shape of the gasket central opening. The secondary duct extends into the main duct through the openings of the gasket and main duct flat surface and has means for securing the secondary duct to the main duct flat surface and gasket.

In accordance with an aspect of this invention, a secondary duct for a forced air ventilation system includes an end portion which is tapered inwardly toward an end thereof. The end portion has formed integrally therewith a plurality of outwardly extending resilient lanced projections, with the distal ends of the projections together defining a plane transverse to the longitudinal direction of the end portion.

In accordance with this invention, a method of tapping off air in a forced air ventilation system having a main duct formed of sheet metal with at least one flat surface comprises the steps of providing a generally planar gasket formed of rigid sheet material and having a central opening, securing the gasket to the main duct flat surface, and cutting an opening in the main duct flat surface by using the gasket central opening as a template so that the opening of the gasket and the main duct flat surface are in overlying registration. There is then provided a secondary duct formed of sheet metal and having an end portion with a cross section matching the shape of the gasket opening. The secondary duct end portion is inserted through the openings of the gasket and the main duct flat surface and the secondary duct is secured to the main duct flat surface and the gasket so as to seal the openings.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
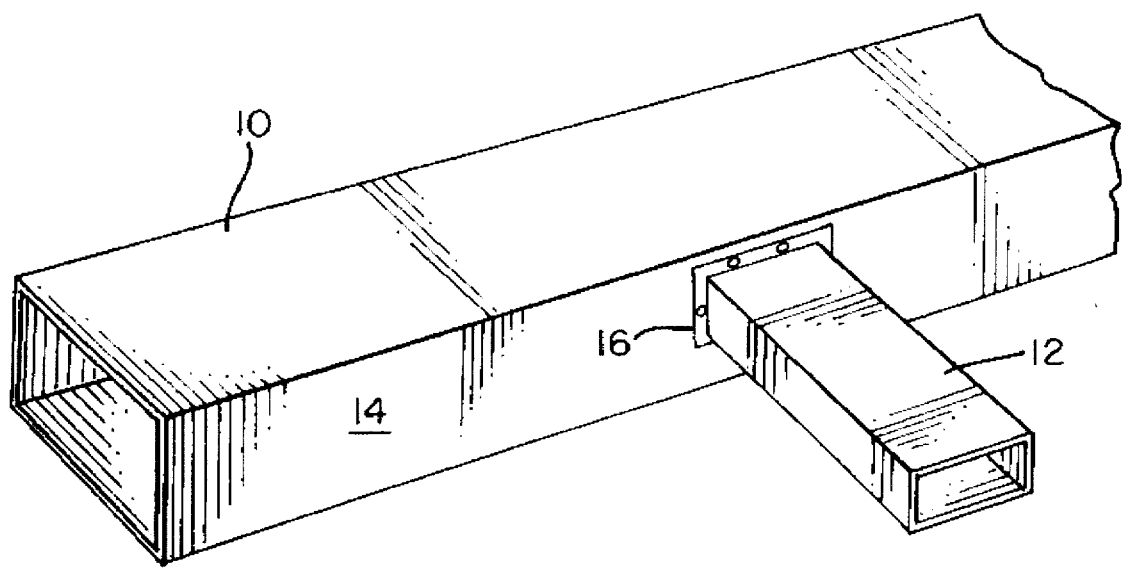
FIG. 1 is a perspective view showing the inventive connection of a secondary duct to a main duct in a forced air ventilation system.
Figure 2:
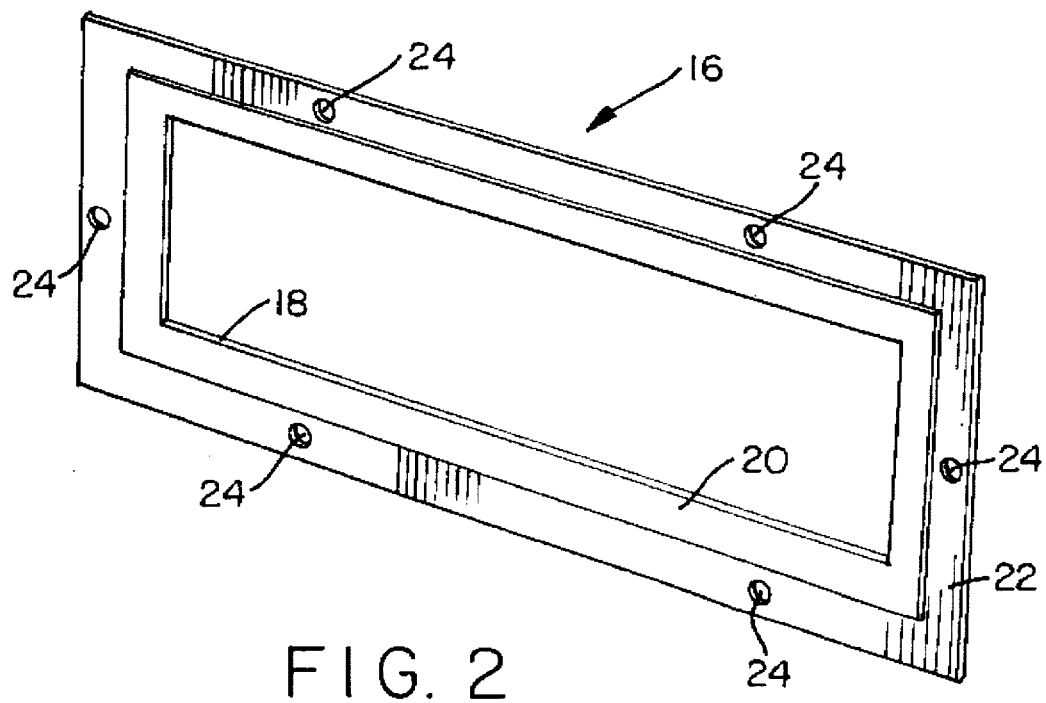
FIG. 2 is a perspective view of a gasket according to the present invention.

As shown in the drawings, a forced air ventilation system includes a main duct 10 which is pressurized from a source of conditioned air. Typically, such pressurization is effected by a motor driven blower assembly which causes air to pass over the surface of a heat exchanger before being directed to the main duct 10. In order to distribute the conditioned air to various parts of the building of which the forced air ventilation system forms a part, a plurality of secondary ducts are provided. The secondary ducts are connected to, and are in fluid communication with, the main duct 10 and extend from the main duct 10 to outlet registers spaced throughout the building. FIG. 1 illustrates one such secondary duct 12 connected to the main duct 10 according to this invention. As shown, the main duct 10 has at least one flat surface 14. Secured to the main duct flat surface 14 is a generally planar gasket 16 constructed according to this invention. As shown in FIG. 2, the gasket 16 is formed of rigid sheet material and has a central opening 18. Illustratively, the opening 18 is rectangular in shape, but may be formed in any other desired shape. The gasket 16 has a raised lip 20 surrounding the opening 18 and offset from the outer planar periphery 22 of the gasket 16. The peripheral portion 22 of the gasket 16 is formed with spaced holes 24 for accepting headed sheet metal screws, as will be discussed hereinafter. Preferably, the gasket 16 is precision stamped and formed from sheet metal, illustratively aluminum.

In accordance with this invention, when the installer determines that a secondary duct is to be connected to the main duct at a particular location, a gasket 16 is secured to the flat surface 14 of the main duct 10 at that particular location by utilizing headed sheet metal screws extending through the holes 24 in the gasket 16. Using the central opening 18 of the gasket 16 as a template, the installer then cuts an opening in the flat surface 14. Accordingly, the opening in the flat surface 14 and the opening 18 of the gasket 16 are in overlying registration. The opening in the main duct should be at least as large as the opening 18.

Figure 3:
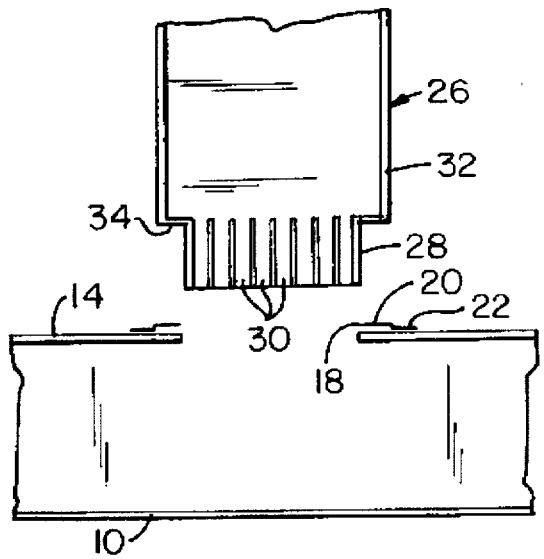
FIGS. 3 and 4 are partially sectioned side views showing the steps in connecting a presently available secondary duct to a main duct according to this invention.
Figure 4:
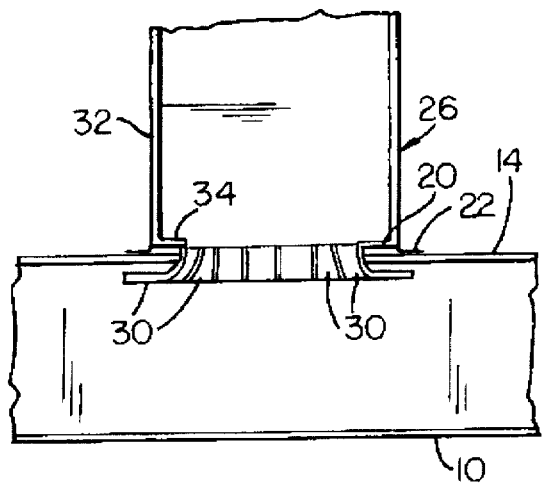

FIGS. 3 and 4 illustrate a presently available secondary duct construction 26 and the manner of its connection to the main duct 10 according to this invention. As shown, the secondary duct 26 has an end portion 28 which is of constant cross section along the longitudinal direction of the secondary duct 26. The end portion 28 is sized to fit within the central opening 18 of the gasket 16 and is slit longitudinally so as to be formed into a plurality of flaps 30 extending along the longitudinal direction of the secondary duct 26. The secondary duct 26 also has a main portion 32 which is larger in cross section than the opening 18 of the gasket 16 and a shoulder portion 34 which lies generally in a plane and joins the end portion 28 and the main portion 32. As shown in FIG. 4, to assemble the secondary duct 26 to the main duct 10, the end portion 28 is inserted through the opening 18 of the gasket 16 and the previously cut opening in the surface 14 until the shoulder portion 34 abuts the raised lip 20. Then, the flaps 30 are folded outwardly against the interior of the flat surface 14 to secure the secondary duct 26 to the main duct 10, with the gasket 16 therebetween providing a seal.

Figure 5:
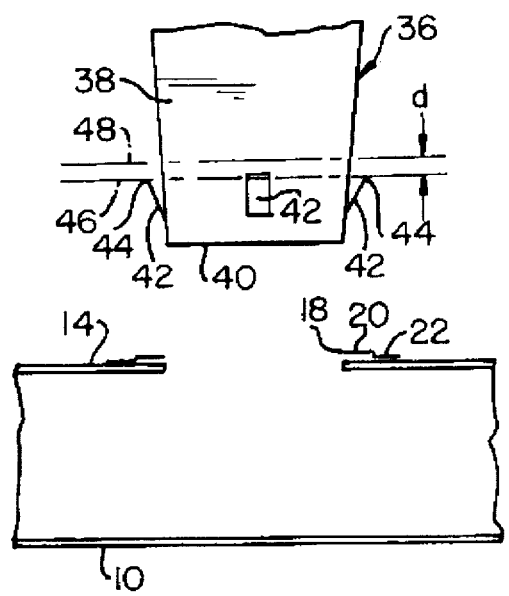
FIGS. 5 and 6 are views similar to FIGS. 3 and 4 showing the connection of an improved secondary duct according to this invention to the main duct of a forced air ventilation system.
Figure 6:
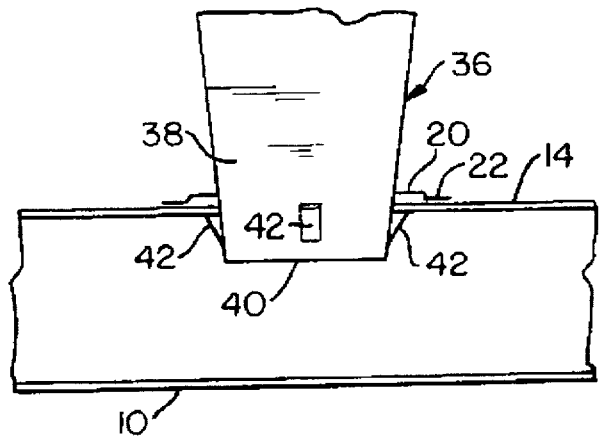

FIGS. 5 and 6 illustrate the connection of an improved secondary duct 36 according to this invention to the main duct 10. As shown, the secondary duct 36 has an end portion 38 which is tapered inwardly toward its end 40. Formed integrally with the end portion 38 are a plurality of outwardly extending resilient lanced projections 42. The distal ends 44 of the projections 42 together define a first plane 46 transverse to the longitudinal direction of the end portion 38. The cross sectional shape of the end portion 38 is proportioned to the configuration of the opening 18 of the gasket 16. The plane 46 defined by the distal ends 44 of the projections 42 is parallel to and spaced from a plane 48 through the end portion 38 wherein the cross section of the end portion 38 matches the size and shape of the opening 18. The planes 46, 48 are separated by a distance "d" equal to the combined height of the gasket 16 and the thickness of the sheet metal of the main duct 10. Accordingly, as is clear from FIG. 6, to connect the secondary duct 36 to the main duct 10, the end portion 38 of the secondary duct 36 is inserted through the opening 18 and through the opening cut into the surface 14 so that the projections 42 are initially pressed inward and then as they pass the opening in the surface 14 they snap outwardly to prevent subsequent removal of the secondary duct 36. At such time, the end portion 38 of the secondary duct 36 is in close engagement to the opening 18 of the gasket 16 so as to effectively seal the opening and prevent significant air leakage.

The construction and use of the gasket 16 results in a number of advantages. The central opening 18 provides a template which allows the installer to easily and accurately cut the opening in the main duct. Use of a mass produced gasket with an accurately formed central opening results in a more effective seal than an opening cut into the main duct by an on-the-job installer. The raised lip 20 of the gasket 16 adds strength and rigidity to the gasket 16 which prevents it from curling. The raised lip 20 also provides a space between the gasket 16 and the surface 14 which aids in the cutting of the opening in the surface 14 without accidentally cutting into the gasket 16. This space adds resiliency to the gasket 16 which provides a more effective seal by allowing the flaps 30 (FIGS. 3 and 4) and the projections 42 (FIGS. 5 and 6) to squeeze the gasket 16 between the secondary duct and the main duct.

Accordingly, there have been disclosed improved apparatus and method for installing a secondary duct to a main duct in a forced air ventilation system. While illustrative embodiments of the present invention have been disclosed herein, it is understood that various modifications and adaptations to the disclosed embodiments will be apparent to those of ordinary skill in the art and it is intended that this invention be limited only by the scope of the appended claims.

What is claimed is:

1. In a forced air ventilation system, the combination of:

a main duct formed of sheet metal with at least one flat surface;

a generally planar gasket secured to said flat surface of said main duct, said gasket being formed of rigid sheet material and having a central opening, said central opening functioning as a template for cutting an opening in said main duct flat surface, said openings of said gasket and said main duct flat surface being in overlying registration; and a secondary duct formed of sheet metal with a cross section matching the shape of said gasket central opening, said secondary duct extending into said main duct through said openings of said gasket and said main duct flat surface, and said secondary duct having means for securing said secondary duct to said main duct flat surface and said gasket.

2. The combination according to claim 1 wherein said secondary duct includes:

an end portion of constant cross section along the longitudinal direction of said secondary duct and sized to fit within said gasket central opening, said securing means including said end portion having formed thereon a plurality of flaps extending along the longitudinal direction of said secondary duct;

a main portion having a cross section larger than said gasket central opening; and a shoulder portion joining said end portion and said main portion, said shoulder portion lying generally in a plane;

whereby to assemble said secondary duct to said main duct, said end portion is inserted through said openings of said gasket and said main duct flat surface until said shoulder portion abuts said gasket, and said end portion flaps are folded outwardly against the interior of said main duct flat surface to secure said secondary duct to said main duct.

3. The combination according to claim 1 wherein said secondary duct includes an end portion which is tapered inwardly toward that end of said secondary duct which extends into said main duct, the cross section of said secondary duct being proportioned to the configuration of said gasket opening, there being a plane through said end portion and transverse to the longitudinal direction of said end portion wherein the cross section of said end portion matches the size and shape of said gasket opening, said securing means including said end portion having secured thereto a plurality of securement members, said securement members being spaced from said plane in the direction of said that end of said secondary duct a distance equal to the combined height of said gasket and the thickness of said main duct sheet metal, said securement members being arranged to allow said end portion to be inserted through said openings of said gasket and said main duct flat surface and thereafter interfere with the removal of said end portion from said openings.

4. The combination according to claim 3 wherein each of said securement members is formed integrally with said end portion as an outwardly extending resilient lanced projection thereof.

5. The combination according to claim 1 wherein said gasket is formed of sheet metal.

6. The combination according to claim 5 wherein said gasket is raised around the periphery of its central opening to provide a space between said gasket and said main duct flat surface around the periphery of said main duct flat surface opening.

7. A method of tapping off air in a forced air ventilation system having a main duct formed of sheet metal with at least one flat surface, comprising the steps of:

providing a generally planar gasket formed of rigid sheet material and having a central opening;

securing said gasket to said main duct flat surface;

cutting an opening in said main duct flat surface by using said gasket central opening as a template so that the openings of said gasket and said main duct flat surface are in overlying registration;

providing a secondary duct formed of sheet metal and having an end portion with a cross section smaller than said gasket opening, and a main portion with a cross section larger than said gasket opening;

inserting said secondary duct end portion through said openings of said gasket and said main duct flat surface until said secondary duct main portion abuts said gasket; and securing said secondary duct to said main duct flat surface and said gasket so as to seal said openings.

8. The method according to claim 7 wherein said secondary duct includes an end portion of constant cross section along the longitudinal direction of said secondary duct and sized to fit within said gasket central opening, said end portion having formed thereon a plurality of flaps extending along the longitudinal direction of said secondary duct, and a shoulder portion lying generally in a plane and joining said end portion and said main portion, and wherein:

the step of inserting includes inserting said secondary duct end portion through said openings until said shoulder portion abuts said gasket; and the step of securing includes folding said end portion flaps outwardly against the interior of said main duct flat surface.

9. The method according to claim 7 wherein said secondary duct includes an end portion which is tapered inwardly toward that end of said secondary duct which extends into said main duct, the cross section of said secondary duct being proportioned to the configuration of said gasket opening, there being a plane through said end portion and transverse to the longitudinal direction of said end portion wherein the cross section of said end portion matches the size and shape of said gasket opening, said end portion having formed integrally therewith a plurality of outwardly extending resilient lanced projections, the distal end of each of said projections being spaced from said plane in the direction of said that end of said secondary duct a distance equal to the combined height of said gasket and the thickness of said main duct sheet metal, and the step of securing includes:

inserting said secondary duct sufficiently through said openings that said lanced projections are within said main duct.

10. A secondary duct for a forced air ventilation system, said secondary duct connected to and in fluid communication with a main duct of said system, said main duct having a planar surface with an opening through which said secondary duct extends, said secondary duct including an end portion which is tapered inwardly toward an end thereof which extends into said main duct through said opening, said end portion having formed integrally therewith a plurality of outwardly extending resilient lanced projections, the distal ends of said projections together defining a plane transverse to the longitudinal direction of said end portion so as to engage the interior planar surface of said main duct.

* * * * *